UNITED STATES PATENT OFFICE.

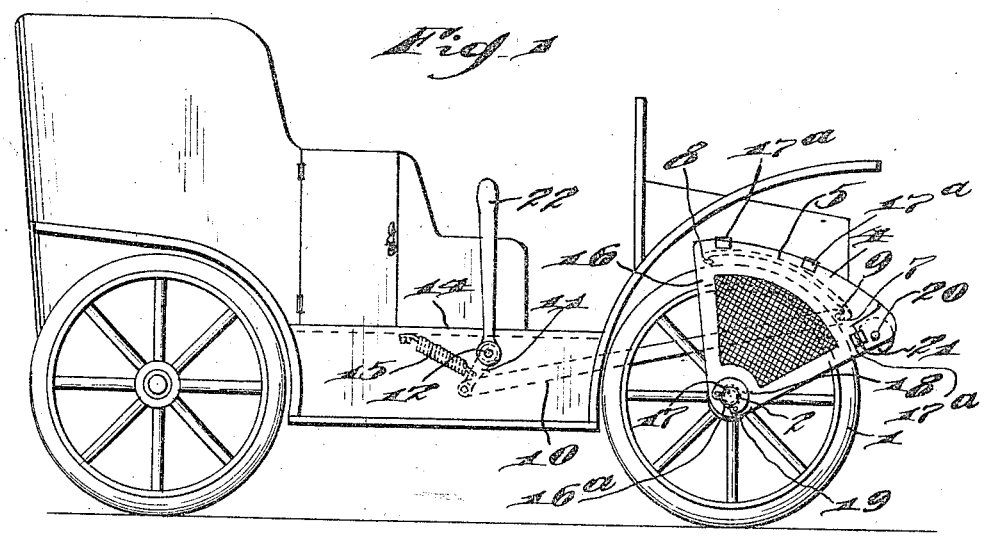

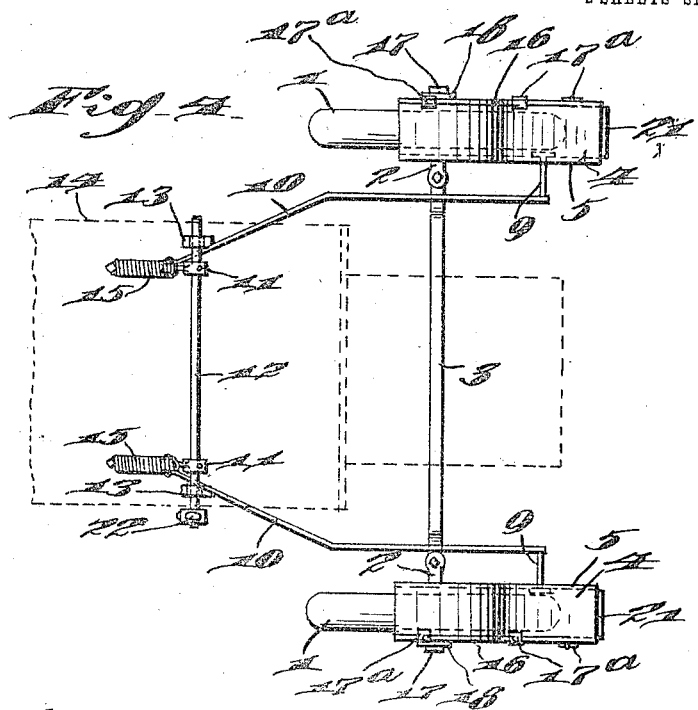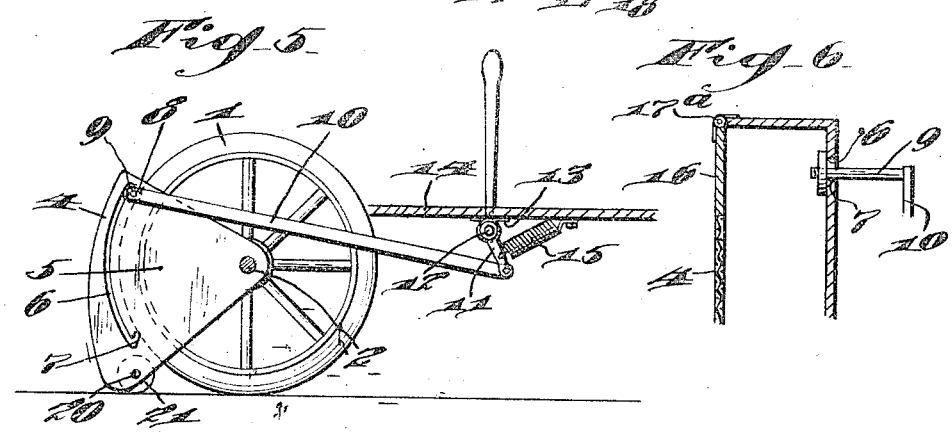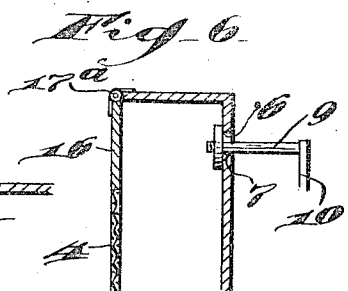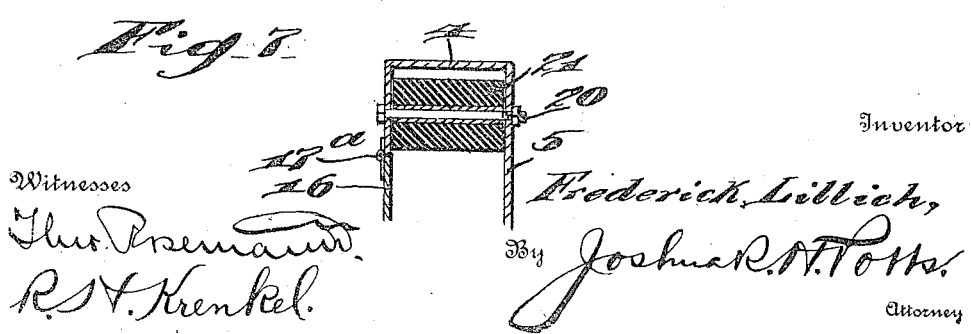

FREDERICK LILLICH, OF PHILADELPHIA, PENNSYLVANIA.

WHEEL-FENDER.

1,011,214. Specification of Letters Patent. Patented Dec. 12, 1911.

Application filed July 26, 1911. Serial No. 640,566.

*To all whom it may concern:*

Be it known that I, FREDERICK LILLICH, a citizen of the United States, residing at Philadelphia, in the county of Philadelphia and State of Pennsylvania, have invented certain new and useful Improvements in Wheel-Fenders, of which the following is a specification.

My invention relates to improvements in wheel fenders, especially adapted for use on automobiles, the primary object being to provide the forward wheels of an automobile with fenders, which are normally held in an elevated position, and adapted to be simultaneously lowered by the operator of the automobile to prevent a person or object from coming in contact with the wheels, a further object of my improved wheel fenders for automobiles being to provide a fender of this character that can be readily attached to any form of automobile, and one which will not interfere with the operation of removing or replacing a tire on the rim of the wheel.

With these and other objects in view, the invention consists in certain novel features of construction, and combinations and arrangements of parts as will be more fully hereinafter described and pointed out in the claims.

Figure 1, is a view in side elevation of an automobile illustrating my improvements thereon. Fig. 2, is a front view. Fig. 3, is a fragmentary view partly in elevation and section illustrating the manner of mounting a fender on the axle stub of a wheel. Fig. 4, is a plan view. Fig. 5, is a view partly in elevation and section showing the fender in its lower position. Figs. 6 and 7, are views in section illustrating details of construction.

1, 1, represent the front wheels of the ordinary form of automobile, and are mounted in the axle stubs 2, 2, of the front axle 3, secured to the frame work of the automobile. On the axle stub 2, 2, my improved fenders 4, 4, are pivotally mounted and are adapted to be held normally in an elevated position in relation to the wheels, and when desired they can be simultaneously dropped to prevent a person or object from coming in contact with the wheels.

In describing my improved fenders 4, 4, the description of the construction of one will answer for both.

My improved fender 4 is U-shaped in section to form a hood to incase a portion of the wheel 1. On the inner face 5 of the fender 4, a slot 6 is cut concentric with the axle stub 2 of the wheel 1, and at each end of this slot 6, are notches 7 and 8 out of alinement with the slot 6, but communicating therewith.

To hold the fender 4 in a normally elevated position in relation to the wheel 1, a pin 9 engages in the notch 7, and this pin 9 is secured to a rod 10, which extends rearwardly, and is pivoted to a crank arm 11 secured to and projecting downwardly and rearwardly from a shaft 12 mounted in bearing brackets 13 on the under face of the platform 14 under the operator's seat. This crank arm 11 is held under tension by a spring 15 secured thereto, and to the under face of the platform 14.

To allow for the removal and replacing of tires on the wheel 1, the outer face 16 of the fender 4 is hinged as illustrated at 17ª, and is provided with an opening 16ª of greater diameter than the caps 17 on the axle stub 2. A catch 18 is pivoted at 19 to outer face 16, and when the cap 17 on the axle stub 2 is projected through the opening 16ª, the catch is swung between the outer face 16 and the cap 17 on the axle stub 2 to prevent the hinged outer face 16 from swinging outwardly.

On the extreme outer portion of the fender 4, I provide a shaft 20 upon which is mounted a roller 21 adapted to roll along the ground when the fender is in its lower position.

On the outer portion of the shaft 12, and extending upwardly in convenient reach of the operator, a lever 22 is secured, and when it is desired to drop the fenders in their lower position, the operator moves the lever 22 rearwardly thereby turning the shaft 12 to impart a forward motion to the spring held crank arms 11, and then to rods 10. When the rods 10 are moved forward, the pins 9 will be moved out of engagement with the notches 7 into the slots 6, and by the force of gravitation, the fenders 4, 4, will drop, and in doing so the pins 9 will ride in the slots 6 until they engage in the notches 8 and hold the fenders in their lower position.

To place the fenders 4 in their normal elevated position, all is necessary is to swing the fenders upward until the pins 9 engage in the notches 7 and the fenders will again be ready for use.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention what I claim as new and desire to secure by Letters Patent is:—

1. In a fender for vehicle wheels, the combination with an automobile, of hoods or casings pivotally mounted on the axle stubs of the front wheels of said automobile, and adapted to be held normally in an elevated position in relation to the said wheels, substantially as described.

2. In a fender for vehicle wheels, the combination with an automobile, of hoods or casings pivotally mounted on the axle stubs of the front wheels of said automobile, and adapted to be held normally in an elevated position in relation to the said wheels, and means for simultaneously dropping the said hoods, substantially as described.

3. In a fender for vehicle wheels, the combination with an automobile, of hoods or casings pivotally mounted on the axle stubs of the front wheels of said automobile, slots cut in the inner faces of said hoods, notches at the ends of said slots out of alinement communicating therewith, pins engaging in one set of notches and means for simultaneously moving said pins out of said notches into said slots, substantially as described.

4. In a fender for vehicle wheels, the combination with an automobile, of a hood or casing pivotally mounted on the axle stub of one of the front wheels of said automobile, a slot cut in the inner face of said hoods concentric with the axle stub, notches at the ends of said slot out of alinement, but communicating therewith, a pin engaging in one of said notches, means for moving said pin out of the said notch into the slot, substantially as described.

5. In a fender for vehicle wheels, the combination with an automobile, of a hood or casing pivotally mounted on the axle stub of one of the front wheels of said automobile, a slot cut in the inner face of said hood concentric with the axle stub, notches at the ends of said slot out of alinement, but communicating therewith, a pin engaging in one of said notches to hold the hood in a normally elevated position in relation to the wheel, said pin secured to a rod, said rod extending rearwardly and pivotally connected to a crank arm, said crank arm secured to a shaft on the under face of the platform, a compression spring secured to the crank arm and said platform, and means for turning said shaft on the under face of the platform, substantially as described.

6. In a fender for vehicle wheels, the combination with an automobile, of a hood or casing pivotally mounted on the axle stub of one of the front wheels of said automobile, said hood comprising an inner and outer face and an intermediate portion connecting the same, said outer face hinged to the said intermediate portion of said hood, an opening of greater diameter than the axle stub cap at the lower portion of the said hinged outer face, said axle stub cap adapted to be projected through the opening in the lower portion of the said hinged outer face, a catch pivoted on the hinged outer face of said hood and adapted to engage between the axle stub and the said outer face, a roller positioned between the inner and outer faces of said hood and adapted to roll on the ground when the hood is in its lower position, substantially as described.

7. In a fender for vehicle wheels, the combination with an automobile, of a hood or casing pivotally mounted on the axle stub of one of the front wheels of said automobile, said hood comprising an inner and outer face and an intermediate portion connecting the same, a slot cut in the inner face concentric with the said axle stub, notches at the ends of said slot, out of alinement but communicating therewith, a pin adapted to be held in said notches and engage in said slot, said outer face hinged to the said intermediate portion of said hood, an opening of greater diameter than the axle stub cap at the lower portion of the said hinged outer face, said axle stub cap adapted to be projected through the opening in the lower portion of the said hinged outer face, a catch pivoted on the hinged outer face of said hood and adapted to engage between the axle stub and the said outer face, a roller positioned between the inner and outer faces of said hood, and adapted to roll on the ground when the hood is in its lower position, substantially as described.

In testimony whereof I have signed my name to this specification in the presence of two subscribing witnesses.

FREDERICK LILLICH.

Witnesses:
R. H. KRENKEL,
CHARLES E. POTTS.